(12) United States Patent
Grosjean et al.

(10) Patent No.: US 10,564,176 B2
(45) Date of Patent: Feb. 18, 2020

(54) CAPACITIVE ACCELEROMETER

(71) Applicant: EM Microelectronic-Marin SA, Marin (CH)

(72) Inventors: Sylvain Grosjean, Les Fins (FR); Yonghong Tao, Singapore (SG); Jean-Michel Daga, Aix-en-Provence (FR)

(73) Assignee: EM Microelectronic-Marin SA, Marin (CH)

( * ) Notice: Subject to any disclaimer, the term of this patent is extended or adjusted under 35 U.S.C. 154(b) by 164 days.

(21) Appl. No.: 15/805,232

(22) Filed: Nov. 7, 2017

(65) Prior Publication Data

US 2018/0143219 A1 May 24, 2018

(30) Foreign Application Priority Data

Nov. 24, 2016 (EP) .................................... 16200504

(51) Int. Cl.
  *G01P 15/125* (2006.01)
  *G01P 15/13* (2006.01)
  (Continued)

(52) U.S. Cl.
  CPC ............ *G01P 15/125* (2013.01); *G01P 15/13* (2013.01); *G01P 15/131* (2013.01); *G01P 15/18* (2013.01); *G01P 21/00* (2013.01)

(58) Field of Classification Search
  CPC ........ G01P 15/125; G01P 15/18; G01P 15/13; G01P 15/131
  See application file for complete search history.

(56) References Cited

U.S. PATENT DOCUMENTS 5,343,766 A * 9/1994 Lee ...................... G01D 5/2417
  73/514.18
6,035,694 A * 3/2000 Dupuie ................. G01P 15/125
  73/1.38
(Continued)

FOREIGN PATENT DOCUMENTS

EP      2 966 455 A1     1/2016

OTHER PUBLICATIONS

European Search Report dated Mar. 6, 2017 in European Application 16200504.5, filed on Nov. 24, 2016.

*Primary Examiner* — Helen C Kwok
(74) *Attorney, Agent, or Firm* — Oblon, McClelland, Maier & Neustadt, L.L.P.

(57) ABSTRACT

A capacitive accelerometer for measuring an acceleration value is provided, including a first and a second electrode; a third mobile electrode arranged therebetween, and forming with the first electrode a first capacitor, and with the second electrode a second capacitor, the third electrode being displaced when the accelerometer is subject to acceleration and generates a capacitance difference value transformable to electrical charges; a first and a second voltage source configured to selectively apply first and second voltages to the first and the second electrodes, respectively, and a third voltage to the third electrode, and to generate electrostatic forces acting on the third electrode, the first, second and/or third voltages applied during electrical charge transfers for collecting the electrical charges to measure the acceleration; and an electrostatic force compensator to compensate for missing electrostatic forces due to a modified charge transfer rate, a compensation amount dependent on the modified rate.

15 Claims, 4 Drawing Sheets

(51) Int. Cl.
*G01P 15/18* (2013.01)
*G01P 21/00* (2006.01)

(56) References Cited

U.S. PATENT DOCUMENTS

| | | | | |
|---|---|---|---|---|
| 7,078,916 B2 * | 7/2006 | Denison | ............... | G01D 5/2417 |
| | | | | 324/661 |
| 2001/0032508 A1 * | 10/2001 | Lemkin | ................. | G01P 15/125 |
| | | | | 73/514.32 |
| 2007/0216423 A1 * | 9/2007 | Grosjean | ................. | G01D 5/24 |
| | | | | 324/661 |
| 2010/0219848 A1 * | 9/2010 | Gotoh | ...................... | G01D 1/00 |
| | | | | 324/686 |
| 2010/0231237 A1 * | 9/2010 | Deschildre | ........... | G01D 5/2417 |
| | | | | 324/661 |
| 2013/0187668 A1 * | 7/2013 | Entringer | .............. | G01P 15/125 |
| | | | | 324/679 |
| 2014/0215194 A1 * | 7/2014 | Oyama | .................. | G06F 13/24 |
| | | | | 712/244 |
| 2016/0011014 A1 * | 1/2016 | Entringer | ............. | G01D 5/2417 |
| | | | | 324/661 |
| 2016/0202286 A1 * | 7/2016 | Aaltonen | ............. | G01P 15/125 |
| | | | | 73/1.38 |

* cited by examiner

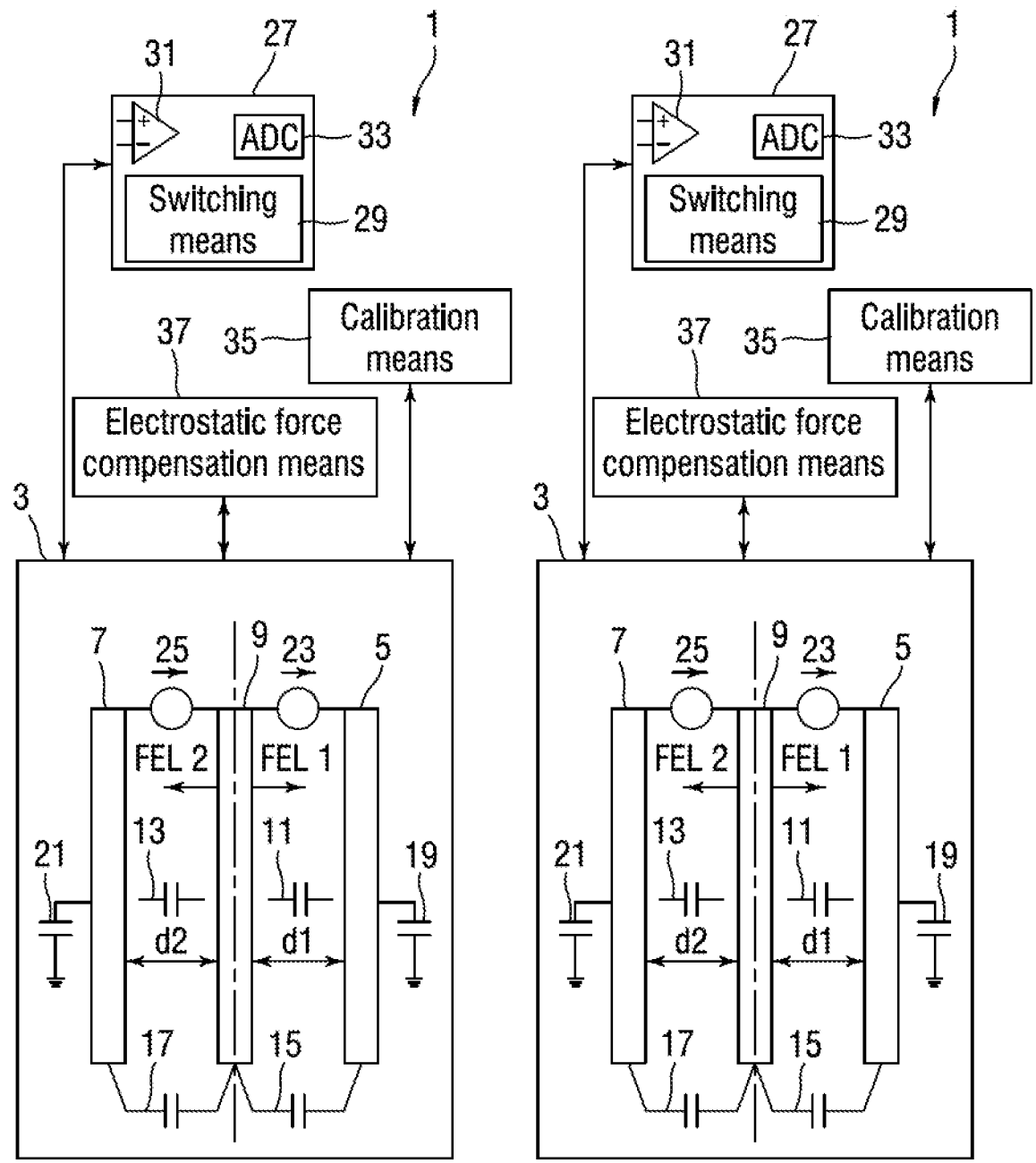

CAPACITIVE ACCELEROMETER

This application claims priority from European Patent Application No. 16200504.5 filed on Nov. 24, 2016, the entire disclosure of which is hereby incorporated herein by reference.

TECHNICAL FIELD

The present invention relates to a capacitive accelerometer for measuring accelerations. The invention also relates to a method for operating the capacitive accelerometer.

BACKGROUND OF THE INVENTION

A capacitive accelerometer is an accelerometer device which measures accelerations (on a surface) using capacitive sensing techniques. It has the ability to sense and record acceleration on equipment or devices and converts this acceleration into electrical currents or voltage. Capacitive accelerometers are also sometimes referred to as vibration sensors. They comprise a capacitive micro-electro-mechanical system (MEMS) element connected to an electronic circuitry. When supplied by an electronic circuitry, the MEMS element will convert the resulting force due to its acceleration into an electrical signal, which in turns is amplified by the electronic circuitry, and converted to a useful signal for a given application (for example a digital representation of the acceleration). In capacitive MEMS accelerometers, the signal is due to the change of the MEMS capacitance in presence of the acceleration. Capacitive accelerometers are widely implemented in computational and commercial applications, such as airbag deployment sensors in automobiles, human computer interaction devices and smartphones.

Capacitive accelerometers typically have some manufacturing imperfections due to a non-perfect manufacturing process. For instance, the capacitive accelerometers typically comprise some parasitic capacitance values which vary from one capacitive accelerometer to another. Furthermore, when measuring the capacitance generated by the acceleration, electrostatic forces are often generated which have a negative impact on the precision of the measured acceleration value. The cancellation of the electrostatic force effect without degrading the MEMS output useful signal is one of the key challenges to be addressed. The purpose of this invention is to allow electrostatic force effect cancellation when using a MEMS excitation strategy that optimizes the signal over noise ratio.

SUMMARY OF THE INVENTION

It is furthermore an object of the present invention to overcome the effect of the electrostatic forces that generate a parasitic signal that is superimposed to the useful signal generated by the acceleration in a capacitive accelerometer.

According to a first aspect of the invention, there is provided a capacitive accelerometer for measuring an acceleration value, the accelerometer comprising:
  a first electrode;
  a second electrode;
  a third mobile electrode arranged between the first and second electrodes, and forming with the first electrode a first capacitor with a first capacitance value, and with the second electrode a second capacitor with a second capacitance value, the third electrode is arranged to be displaced when the capacitive accelerometer is subject to acceleration thereby arranged to generate a capacitance difference value between the first and second capacitances transformable to electrical charges;
  a first voltage source and a second voltage source for selectively applying a first voltage value to the first electrode, a second voltage value to the second electrode and a third voltage value to the third electrode, and arranged to generate electrostatic forces acting on the third electrode,
  wherein the first, second and/or third voltage values are arranged to be applied during electrical charge transfers for collecting the electrical charges in order to measure the acceleration, and
  wherein the accelerometer comprises electrostatic force compensation means for compensating missing electrostatic forces owing to a modified charge transfer rate, the amount of compensation being dependent on the modified charge transfer rate.

The proposed new solution has the advantage that missing electrostatic forces due to missing charge transfers (i.e. due to missing capacitance measurements) can be reliably compensated irrespective of the frequency of the electrical charge transfers. This ensures an easy and reliable calibration of the capacitive accelerometer. Since the capacitance sampling rate of the accelerometer can be reduced (without compromising the measurements), it is possible to save power.

According to a second aspect of the invention, there is provided a method for operating the capacitive accelerometer according to the first aspect.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which:

FIG. 1 is a simplified block diagram illustrating the capacitive accelerometer according to one example the present invention;

FIG. 2 is a simplified block diagram illustrating the capacitive accelerometer of FIG. 1, but where the capacitive accelerometer is subject to acceleration;

DETAILED DESCRIPTION OF THE INVENTION

Figure 3:
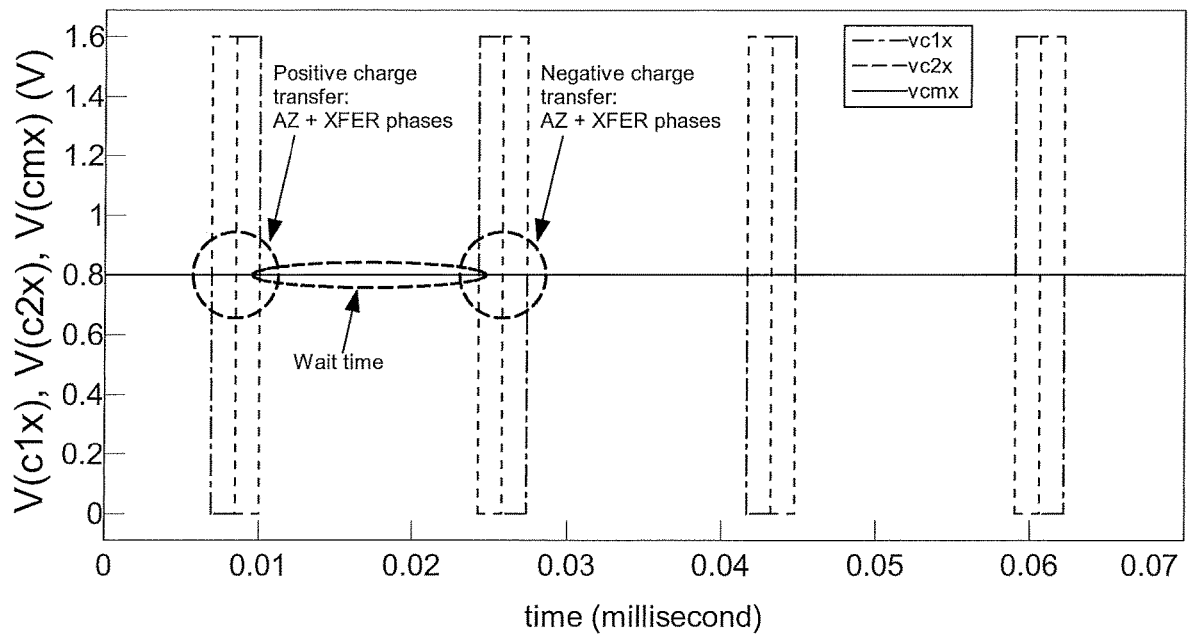
FIG. 3 is a diagram illustrating example voltage values as a function of time applied across the electrodes of the capacitive accelerometer of FIG. 1.

An embodiment of the present invention will now be described in detail with reference to the attached figures. The invention will be described in the context of a capacitive accelerometer comprising two capacitors. However, the disclosed capacitive accelerometer is not limited to a solution comprising two capacitors. Identical or corresponding functional and structural elements which appear in different drawings are assigned the same reference numerals.

FIG. 1 illustrates a capacitive accelerometer system or device 1, referred to simply as a capacitive accelerometer or accelerometer, according to an example of the present invention. There is shown a micro-electro-mechanical system (MEMS), which operates as a capacitive accelerometer sensor 3. The sensor 3 comprises a first electrode 5, a second electrode 7 and a third electrode 9. In this example, all the electrodes are plate electrodes, such as metal plates, and arranged substantially parallel to each other so that the third electrode 9 is located between the first and second electrodes 5, 7. Furthermore, according to this example, the first and second electrodes 5, 7 are fixed electrodes, i.e. they are stationary, while the third electrode 9 is a mobile electrode, i.e. it is arranged to be displaced if the sensor is subject to acceleration. However, in the configuration of FIG. 1, the sensor 3 is not subject to any acceleration, and consequently the mobile electrode 9 is centrally located between the first and second electrodes 5, 7. In this example, the distance d1 between the first and third electrodes is 2 μm, while the distance d2 between the second and third electrodes is also 2 μm. The first and third electrodes 5, 9 together form a first sensing capacitor 11 with first capacitance cs1, while the second and third electrodes 7, 9 together form a second sensing capacitor 13 with second capacitance cs2. There are further shown a first parasitic sensing capacitor 15 with third capacitance cps1, and a second parasitic sensing capacitor 17 with fourth capacitance cps2. Two further parasitic capacitors 19, 21 are shown, but they can be omitted in the following description.

A first voltage source 23 is provided between the first and third electrodes 5, 9, while a second voltage source 25 is provided between the second and third electrodes 7, 9. The voltage sources can be selectively turned on and off as explained later in more detail. The accelerometer sensor 3 uses "force=mass×acceleration" property to transfer acceleration to force, and then the force is transferred to a mobile electrode displacement x through the spring stiffness.

The mobile electrode displacement x (see FIG. 2) generates a capacitance difference between the first capacitance cs1 and the second capacitance cs2, referred to as differential capacitance dc so that dc=(cs1−cs2+cps1−cps2), where cps1 and cps2 are typically so small that they can be ignored. The differential capacitance dc is transformed to electrical charges by an interface electronic circuit 27, which is an integrated circuit (IC) connected to the sensor 3. For this purpose the electronic circuit 27 comprises switching means 29 for applying voltage, by using the first and second voltage sources 23, 25, across the first and second sensing capacitors 11, 13. The resulting charges are collected and measured by the electronic circuit 27. The number of charges is proportional to the differential capacitance and to the voltage applied across the first and second sensing capacitors 11, 13.

From the above explanation it becomes clear that the overall transfer function of the capacitive accelerometer 1 is from a physical parameter "acceleration" to an electrical parameter "electrical charges". The gain of this transfer function is proportional to the voltage applied across the first and second sensing capacitors 11, 13. Thus, in order to maximise the signal/noise ratio of the capacitive accelerometer 1, the voltage applied to the electrodes has to be maximised. In the following example, the maximum voltage value equals 1.6 V.

The electronic circuit 27 further comprises an amplifier 31 which has two inputs, namely one positive input and one negative input. The positive input is connected to a voltage source, which may not be the first or second voltage source 23, 25. The negative input in this example is connected to the mobile electrode 9. A capacitance between the negative input node and the output node of the amplifier 31 is referred to as a feedback capacitance cfb. It is the internal capacitance of the amplifier 31. The output of the amplifier 31 is connected to an analogue-to-digital converter (ADC) 33. In FIGS. 1 and 2, there are further shown calibration means 35 for calibrating the accelerometer 1, and electrostatic force compensation means 37 whose purpose are explained later in more detail.

In the present example, the charges are collected from the mobile electrode 9 by applying two successive phases (i.e. first and second phases defining a charge transfer period or duration) of each of the two voltage polarities. The first phase is referred to as an auto-zero (AZ) phase, while the second phase is referred to as a transfer (XFER) phase. During the AZ phase, the amplifier 31 is reset. During the XFER phase, the charges are transferred to the amplifier 31, which transforms these charges to a voltage value through the feedback capacitance. In the following, v(c1) denotes the voltage applied to the first electrode 5, v(c2) denotes the voltage applied to the second electrode 7, and v(cm) denotes the voltage applied to the mobile electrode 9. In this example, for the positive polarity we obtain:

AZ phase: $v(c1)=0$ V, $v(c2)=1.6$ V, $v(cm)=0.8$ V; and

XFER phase: $v(c1)=1.6$ V, $v(c2)=0$ V, $v(cm)=0.8$ V

These numerical values lead to an output voltage of the electronic circuit 27 for the positive polarity $v(outp)=1.6 \times dc/cfb$. In this example, for the negative polarity we obtain:

AZ phase: $v(c1)=1.6$ V, $v(c2)=0$ V, $v(cm)=0.8$ V; and

XFER phase: $v(c1)=0$ V, $v(c2)=1.6$ V, $v(cm)=0.8$ V.

These numerical values lead to an output voltage of the electronic circuit 27 for the negative polarity $v(outn)=-1.6 \times dc/cfb$. After the ADC conversion, v(outp) and v(outn) can be subtracted to obtain $(v(outp)-v(outn))=3.2 \times dc/cfb$ whose sign is thus always positive.

The above phases are graphically illustrated in FIG. 3, which shows the voltages (v(c1), v(c2) and v(cm)) applied to the first, second and third electrodes 5, 7, 9 as a function of time. It is to be noted that the capacitive accelerometer 1 may operate as a multi-axis accelerometer (eg axes x, y and z), but FIG. 3 illustrates the voltages applied to one axis only, in this case the x-axis. The time between the charge transfers may be used for measuring the other axes and for data processing.

The drawback of the voltages applied to the accelerometer sensor 3 to measure the charges is that they also generate (opposing) electrostatic forces FEL1 and FEL2 shown in FIGS. 1 and 2. The resulting total force FEL=FEL1+FEL2 applies to the mobile electrode 9 and adds to the force resulting from the acceleration we want to measure. If the same voltage is applied across cs1 and cs2, the electrostatic force FEL pulls the mobile electrode 9 towards the first or second electrode 5, 7 depending on which one corresponds to the highest capacitance value. The electrostatic forces are determined in the following manner:

$$FEL1 = +0.5/d0 \times c0/((1-x/d0)^2) \times (v(c1)-v(cm))^2; \text{ and}$$

$$FEL2 = -0.5/d0 \times c0/((1+x/d0)^2) \times (v(c2)-v(cm))^2,$$

where:
- $d0$=nominal distance of electrodes (2 μm in this example);
- $c0$=nominal capacitance ($c0 = cs1 \times (1-x/d0)$);
- $x$=mobile electrode displacement;
- $v(c1)$=voltage applied to the first electrode 5;
- $v(c2)$=voltage applied to the second electrode 7; and
- $v(cm)$=voltage applied to the mobile electrode 9.

Figure 4:
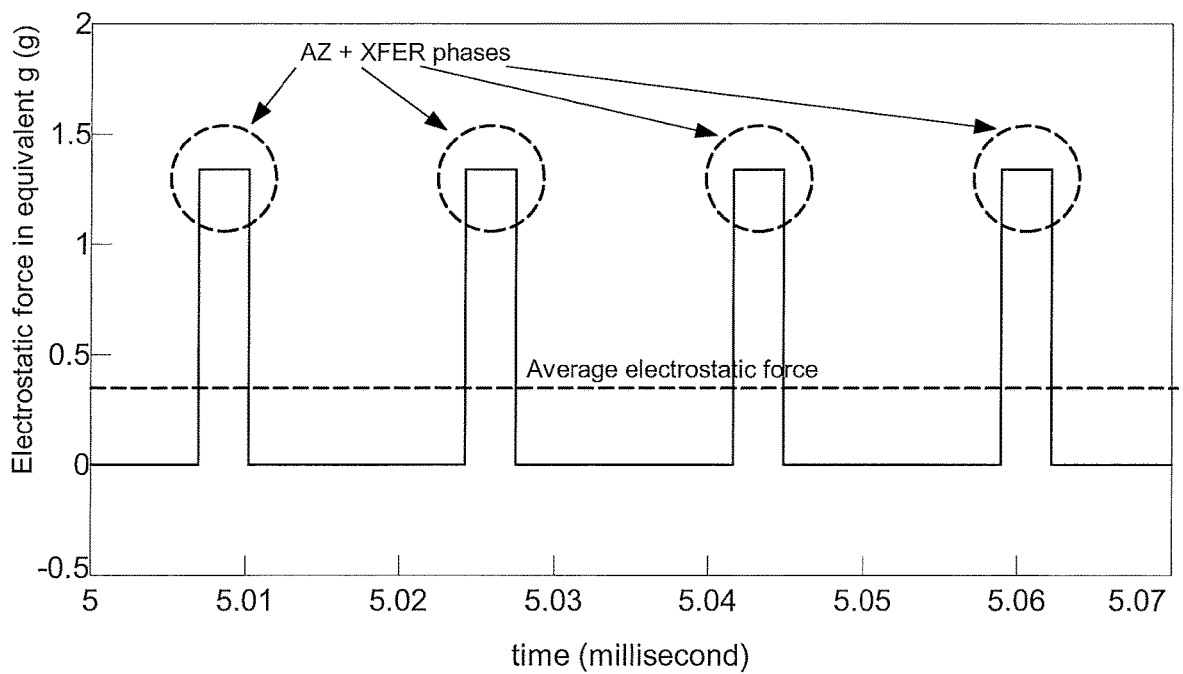
FIG. 4 is a diagram illustrating example values of the electrostatic forces generated during charge transfers with a maximum duty cycle in the capacitive accelerometer of FIG. 1.

If $x=0$, $FEL=0$, because in this example $v(cm)$ is chosen to be $(v(c1)+v(c2))/2$. However, if x is not zero, then FEL is not zero. This leads to a parasitic signal which is added to the acceleration we want to measure. This parasitic signal can be calculated in its equivalent signal so that the equivalent signal is given as the acceleration of gravity (1 g=9.81 m/s$^2$) multiplied by a given coefficient. This situation is illustrated in FIG. 4. In this example, the accelerometer sensor 3 has a large, 15 g offset (i.e. large mobile electrode displacement even when no acceleration is applied). In FIG. 4, the electrostatic forces can be seen in their equivalent value. The amplitude of the electrostatic forces is large compared to the measured acceleration (typical acceleration is between +2 g and −2 g) if the accelerometer sensor 3 has a large offset (here 15 g). It is to be noted that since the accelerometer sensor 3 acts as a low pass filter, it is sensitive to the average value (electrostatic force). In this example, the average value of the equivalent signal is about 0.4 g. However, it is possible to cancel this parasitic acceleration together with the accelerometer offset during a calibration procedure of the capacitive accelerometer 1.

Figure 5:
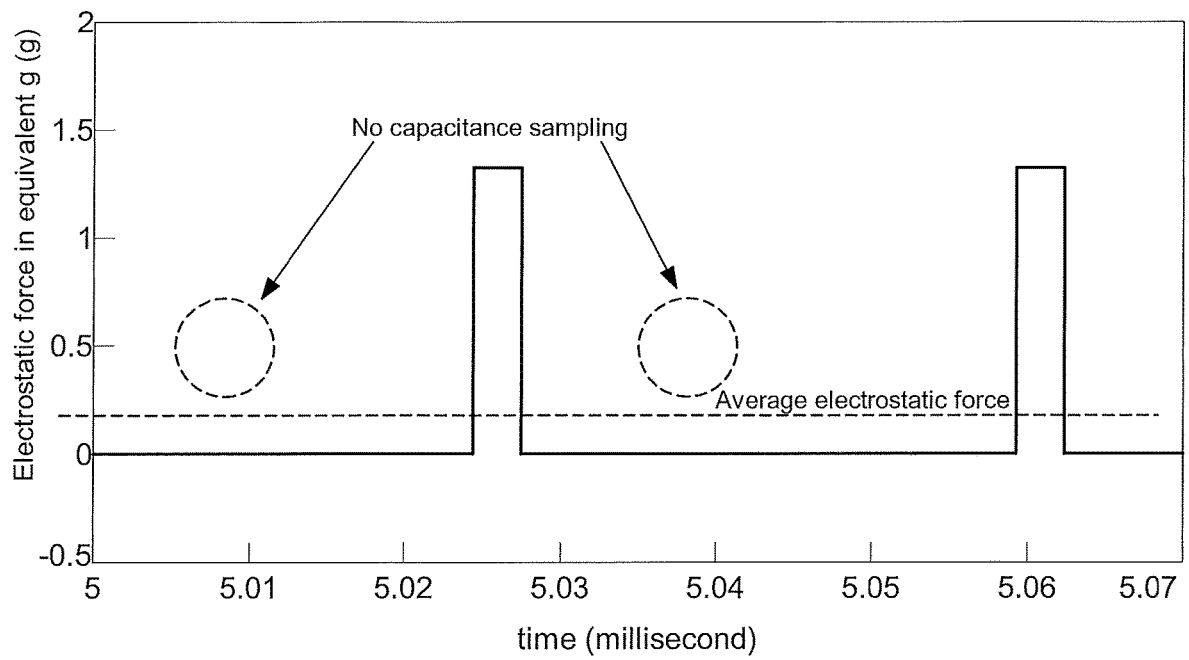
FIG. 5 is a diagram illustrating example values of the electrostatic forces generated during charge transfers with a half of the duty cycle of FIG. 4.
Figure 6:
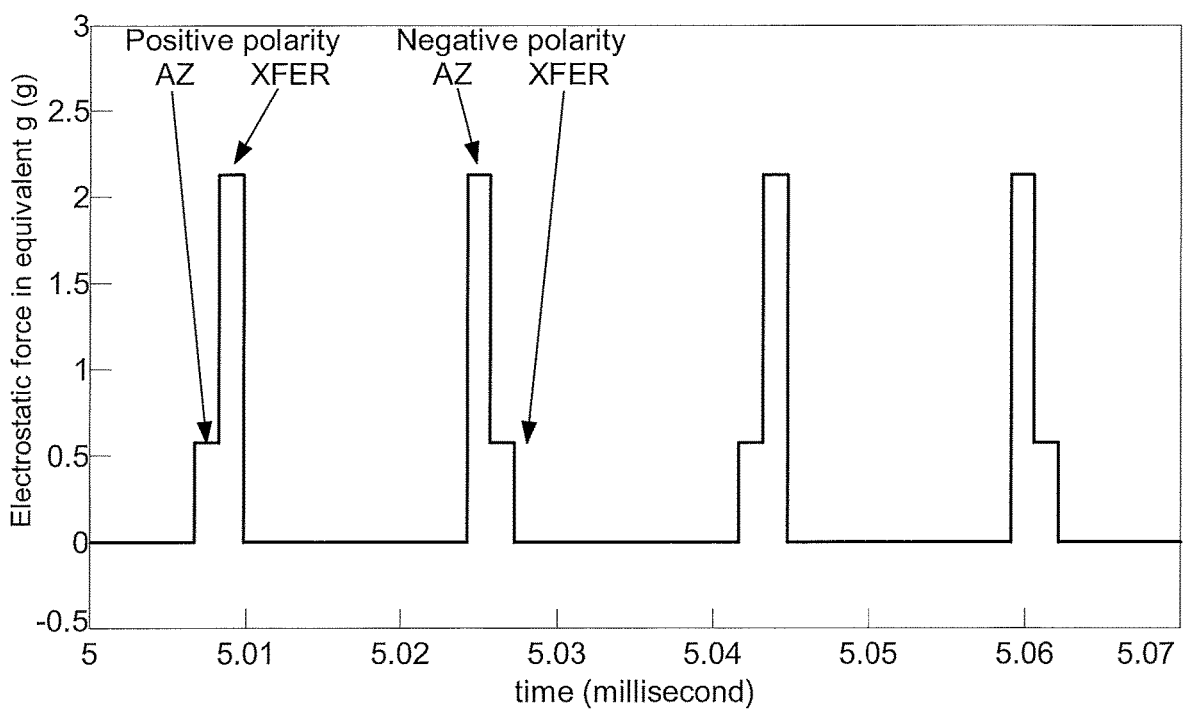
FIG. 6 is a diagram illustrating example values of the electrostatic forces generated during charge transfers with a maximum duty cycle in the capacitive accelerometer of FIG. 1 but where the electrostatic forces are not constant during one charge transfer period.

It has been discovered that if the accelerometer capacitance measurement rate or frequency (also referred to as an oversampling rate (OSR)) is decreased (from its maximal value), this also leads to decreased electrostatic forces. This means that the electrostatic forces do not remain constant between measurement cycles having different capacitance measurement rates. This further means that the accelerometer 1 is no longer properly calibrated. This is perhaps the most serious drawback of the electrostatic forces. For instance, one may wish to remove every other charge transfer in order to lower current consumption. However, in this case the electrostatic forces are generated with a smaller duty cycle leading to a lower average value. As the accelerometer (the MEMS sensor 3 and the electronic circuit 27) calibration is typically done for a maximum oversampling rate, the calibration can no longer correctly compensate the changed electrostatic forces. This is illustrated in FIG. 5. As can be seen, the average equivalent value is only about 0.2 g because the capacitance sampling rate is only half of the rate in FIG. 4. However, if during the AZ and XFER phases, $v(cm)$ is not equal to $(v(c1)+v(c2))/2$ (in this example 0.8 V), the electrostatic forces are not the same during the AZ and XFER phases and their values depend on the polarity. The diagram in FIG. 6 shows what happens if $v(cm)=0.75$ V. Two different electrostatic force amplitudes can be seen: FEL AZ positive=FEL XFER negative (the smaller amplitude in this example) and FEL XFER positive=FEL AZ negative (the larger amplitude). In the present description, "FEL AZ positive" denotes the electrostatic forces resulting from the positive polarity of the AZ phase, "FEL XFER positive" denotes the electrostatic forces resulting from the positive polarity of the XFER phase, "FEL AZ negative" denotes the electrostatic forces resulting from the negative polarity of the AZ phase, and "FEL XFER negative" denotes the electrostatic forces resulting from the negative polarity of the XFER phase.

According to one embodiment of the present invention, in order to maintain the average electrostatic force (FEL average) value constant irrespective of the capacitance sampling rate (charge transfer rate), the skipped charge transfers are replaced by spare excitations to generate electrostatic forces whose magnitude is equal to the skipped electrostatic forces. This can be done by applying a suitable voltage to the first, second and third electrodes 5, 7, 9. For this purpose, the capacitive accelerometer comprises the compensation means 37, which determine how many charge transfers are skipped (compared to the duty cycle) and what the electrostatic forces resulting from these skipped transfers would have been. It is to be noted that the electronic circuit 27 can be turned off during the spare excitations to save energy. As a result, energy can be saved compared to a situation in which no charge transfers are skipped, because the power consumption of the electronic circuit 27 (due to the power consumption of the amplifier 31 used for AZ and XFER phases) is much higher than the power consumption of the compensation means when used to apply the suitable voltages to the electrodes 5, 7, 9. In other words, applying the voltages across the capacitors 11, 13 can be done with much lower current than current needed to enable the charge transfers (by the electronic circuit 27). Furthermore, it is possible to use the low-pass filter characteristic of the capacitive accelerometer sensor 3 to generate the FEL AZ positive of the missing charge transfers 1 and 3 in one single pulse and the FEL XFER positive of the missing charge transfers 1 and 3 in another single pulse. This saves power because capacitance switching (cs1 and cs2) can be minimised. This is graphically illustrated in FIG. 7.

Figure 7:
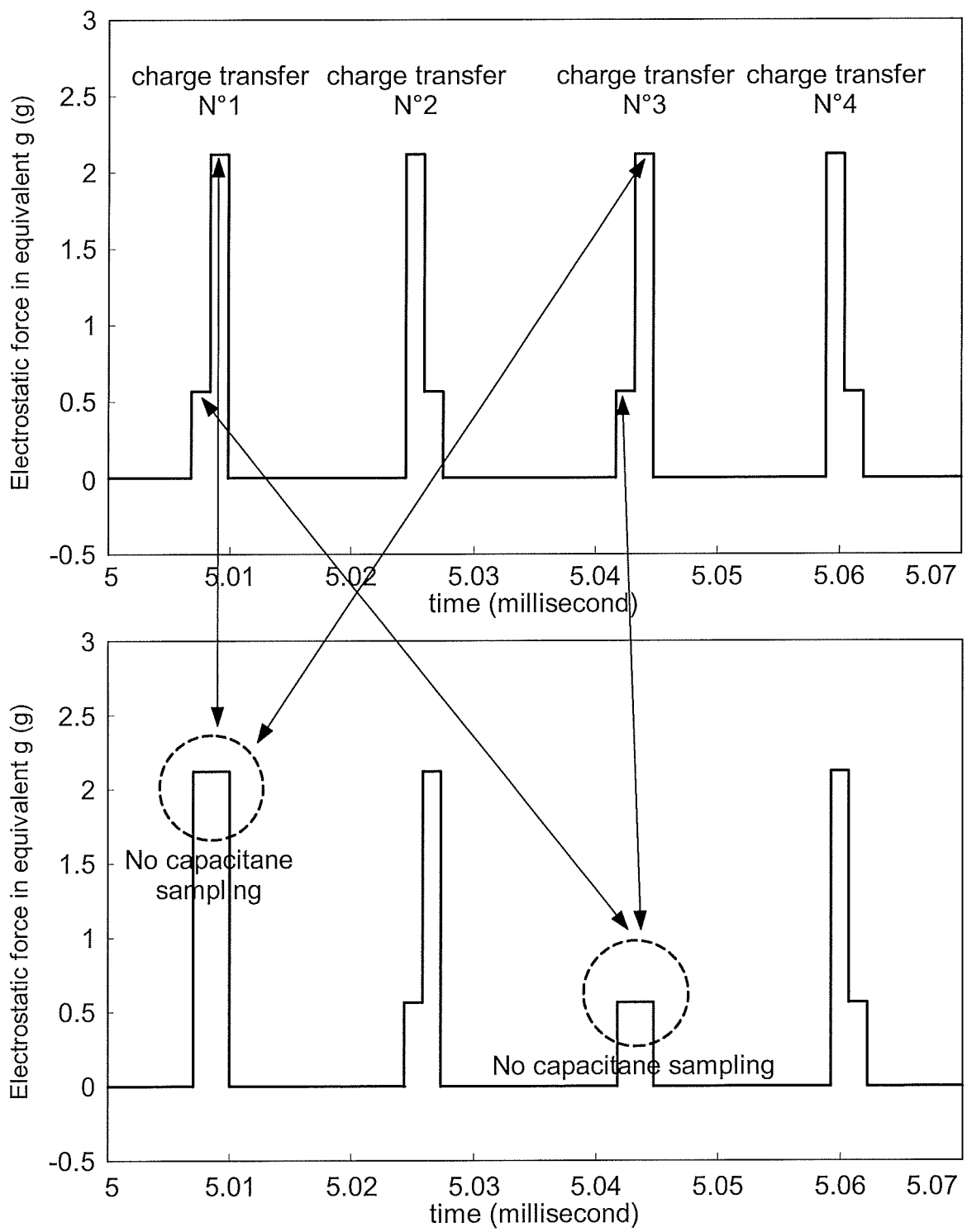
FIG. 7 shows two diagrams illustrating the principle of compensating missing electrostatic forces in the capacitive accelerometer of FIG. 1.

In the example of FIG. 7, the positive polarity charge transfers are omitted. However, it would be possible to keep the positive polarity charge transfers and omit the negative polarity charges instead. It is further to be noted that the above described capacitive accelerometer sensor 3 could be driven with pulses of single polarity only. The magnitudes of the voltage excitations may be chosen to be the same as the voltage values applied during the charge transfers. In the example explained above, during the omitted charge transfers 1, 5, 9 etc. the following voltages are applied: $v(c1)=1.6$ V, $v(c2)=0$ V and $v(cm)=0.75$ V, while during the omitted charge transfers 3, 7, 11 etc. the following voltages are applied: $v(c1)=0$ V, $v(c2)=1.6$ V and $v(cm)=0.75$ V. Thanks to the generation of the dummy electrostatic forces to replace the omitted charge transfers, it is possible to maintain the magnitude of the electrostatic forces constant irrespective of the capacitance sampling rate of the accelerometer sensor 3, making the calibration of the capacitive accelerometer system 1 easier.

According to a variant of the present invention, the electrostatic forces are not compensated during the omitted charge transfers. According to this variant, the magnitude of the missing electrostatic forces resulting from an omission of the charge transfers is determined (for example by the compensation means 35) and stored in a memory (for example a non-volatile memory), which may be part of the compensation means 37. The end-user can then take these values stored in the memory into account while performing acceleration measurements. This may be done for instance so that the stored values or values directly derivable from the stored values are subtracted from the output of the ADC 33, for example.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For example, the compensation means 37 and/or the calibration means 35 may be part of the electronic circuit 27.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. A capacitive accelerometer for measuring an acceleration value, the capacitive accelerometer comprising:
   a first electrode;
   a second electrode;
   a third mobile electrode arranged between the first and the second electrodes, and forming with the first electrode a first capacitor with a first capacitance value, and with the second electrode a second capacitor with a second capacitance value, the third electrode is configured to be displaced when the capacitive accelerometer is subject to an acceleration and thereby configured to generate a capacitance difference value between the first and the second capacitance values transformable to electrical charges;
   a first voltage source and a second voltage source configured to selectively apply a first voltage value to the first electrode, a second voltage value to the second electrode and a third voltage value to the third electrode, and being configured to generate electrostatic forces acting on the third electrode,
   wherein the first, the second, and/or the third voltage values are configured to be applied during electrical charge transfers for collecting the electrical charges in order to measure the acceleration; and
   an electrostatic force compensation means for compensating missing electrostatic forces due to a modified charge transfer rate, an amount of compensation being dependent on the modified charge transfer rate,
   wherein the electrostatic force compensation means for compensating missing electrostatic forces is configured to determine a number of skipped electrical charge transfers in the modified charge transfer rate and to determine a value of electrostatic force for each skipped electrical charge transfer among said number, thereby to maintain an average electrostatic force value that is constant irrespective of a capacitance sampling rate.

2. The capacitive accelerometer according to claim 1, further comprising a calibration means arranged to calibrate the capacitive accelerometer by using a maximal charge transfer rate.

3. The capacitive accelerometer according to claim 1, wherein the first voltage value or the second voltage value is zero.

4. The capacitive accelerometer according to claim 1, wherein the first and the second electrodes are fixed.

5. The capacitive accelerometer according to claim 1, wherein the capacitive accelerometer is a multi-axis accelerometer.

6. The capacitive accelerometer according to claim 1,
   further comprising an electronic circuit configured to collect the electrical charges,
   wherein one charge transfer comprises a first phase and a second phase, and
   wherein the electronic circuit is further configured to apply the first voltage value and the second voltage value differently during the first and the second phases.

7. The capacitive accelerometer according to claim 6, wherein the electrostatic forces generated during the first and the second phases are different.

8. The capacitive accelerometer according to claim 1, wherein the third voltage value is substantially equal to a sum of the first and the second voltage values divided by two.

9. The capacitive accelerometer according to claim 1, wherein the electrostatic force compensation means are arranged to generate compensating electrostatic forces to be applied to the third electrode, a value of the compensating electrostatic forces being dependent on the electrical charge transfer rate.

10. The capacitive accelerometer according to claim 9, wherein the electrostatic force compensation means are configured to selectively turn on and turn off the first and the second voltage sources to generate the compensating electrostatic forces.

11. The capacitive accelerometer according to claim 9,
    further comprising an electronic circuit configured to collect the electrical charges,
    wherein one charge transfer comprises a first phase and a second phase,
    wherein the electronic circuit is further configured to apply the first voltage value and the second voltage value differently during the first and the second phases, and
    wherein the electrostatic force compensation means are arranged to generate compensating electrostatic forces as pulses such that one pulse is configured to compensate missing electrostatic forces resulting from two first or second phases of two missing charge transfers.

12. The capacitive accelerometer according to claim 11, wherein the electrostatic force compensation means comprise a means for determining a magnitude of the missing electrostatic forces resulting from the missing charge transfers.

13. The capacitive accelerometer according to claim 12, further comprising a memory configured to store compensation values indicating a magnitude of the missing electrostatic forces resulting from the missing charge transfers.

14. The capacitive accelerometer according to claim 13, further comprising a transformation means for transforming the electrical charges after the charge transfers to an intermediate acceleration value and to a final acceleration value after having applied the compensation values to the intermediate acceleration value.

15. A method for measuring an acceleration by using the capacitive accelerometer according to claim 1.

* * * * *